US 8,617,296 B2

(12) United States Patent
Dallinga et al.

(10) Patent No.: US 8,617,296 B2
(45) Date of Patent: Dec. 31, 2013

(54) FILLING PISTOL AND METHOD FOR FILLING AN OBJECT ESSENTIALLY WITH NITROGEN

(75) Inventors: Barry Dallinga, Oosterhout (NL); Johannes Henricus Antonius Marie Kamp, Etten-Leur (NL)

(73) Assignee: Parker Hannifin Mfg. Etten-Leur NL, Etten-Leur (NL)

( * ) Notice: Subject to any disclaimer, the term of this patent is extended or adjusted under 35 U.S.C. 154(b) by 113 days.

(21) Appl. No.: 13/115,415

(22) Filed: May 25, 2011

(65) Prior Publication Data

US 2011/0232802 A1    Sep. 29, 2011

Related U.S. Application Data

(63) Continuation of application No. PCT/NL2009/050743, filed on Dec. 8, 2009.

(30) Foreign Application Priority Data

Dec. 8, 2008 (NL) .................................. 2002301

(51) Int. Cl.
*B01D 53/22* (2006.01)
(52) U.S. Cl.
USPC ............. 96/4; 95/45; 95/47; 141/38; 141/39; 141/47
(58) Field of Classification Search
USPC .......... 95/45, 47; 141/38, 39, 47, 49, 95; 96/4
See application file for complete search history.

(56) References Cited

U.S. PATENT DOCUMENTS

| 3,540,837 | A | * | 11/1970 | Pascucci | ......................... 43/124 |
| 3,554,027 | A | * | 1/1971 | Sperberg | ......................... 73/146 |
| 4,574,641 | A | * | 3/1986 | Rosaz et al. | ..................... 73/726 |
| 5,282,966 | A | * | 2/1994 | Walker | ....................... 210/321.8 |
| 5,352,272 | A | * | 10/1994 | Moll et al. | ......................... 96/9 |
| 5,431,203 | A | * | 7/1995 | Schultz et al. | ................ 141/197 |
| 5,588,984 | A | * | 12/1996 | Verini | ............................... 95/15 |

(Continued)

FOREIGN PATENT DOCUMENTS

| EP | 0 100 286 A1 | 2/1984 |
| EP | 1 745 835 A1 | 1/2007 |
| WO | 01/76922 A1 | 10/2001 |

OTHER PUBLICATIONS

Notification of Transmittal of the International Preliminary Report on Patentability dated Mar. 1, 2011 in corresponding International Application No. PCT/NL2009/050743.

*Primary Examiner* — Jason M Greene
*Assistant Examiner* — Anthony Shumate
(74) *Attorney, Agent, or Firm* — Christopher H. Hunter

(57) ABSTRACT

A filling pistol for the filling under pressure of an object essentially with nitrogen. The filling pistol has a housing with an inlet opening connectable to an air source, such as an air compressor, to supply air to the pistol. A separation device is incorporated downstream of and connected to the inlet opening to obtain essentially nitrogen-rich gas. An outlet opening is connected to the separation device and is connectable to the object to supply nitrogen-rich air from the filling pistol to the object. The separation device is provided between the air inlet and the nitrogen outlet of an exchangeable separation cartridge. An operating element sets the filling pistol to an operating condition to fill the object with nitrogen-rich air.

34 Claims, 4 Drawing Sheets

(56) References Cited

U.S. PATENT DOCUMENTS

| | | | |
|---|---|---|---|
| 5,878,774 A * | 3/1999 | Zanetti | 137/228 |
| 5,906,227 A * | 5/1999 | Sowry | 141/65 |
| 6,155,313 A * | 12/2000 | Smalley | 141/38 |
| 6,234,221 B1 * | 5/2001 | Clark, II | 141/197 |
| 6,470,923 B1 * | 10/2002 | Gonzaga | 141/38 |
| 6,612,346 B1 * | 9/2003 | Allen et al. | 141/38 |
| 7,624,774 B2 * | 12/2009 | Lighter | 141/237 |
| 8,091,590 B2 * | 1/2012 | Graham | 141/38 |
| 2002/0134794 A1 * | 9/2002 | McManus et al. | 222/55 |
| 2003/0168389 A1 * | 9/2003 | Astle et al. | 210/85 |

* cited by examiner

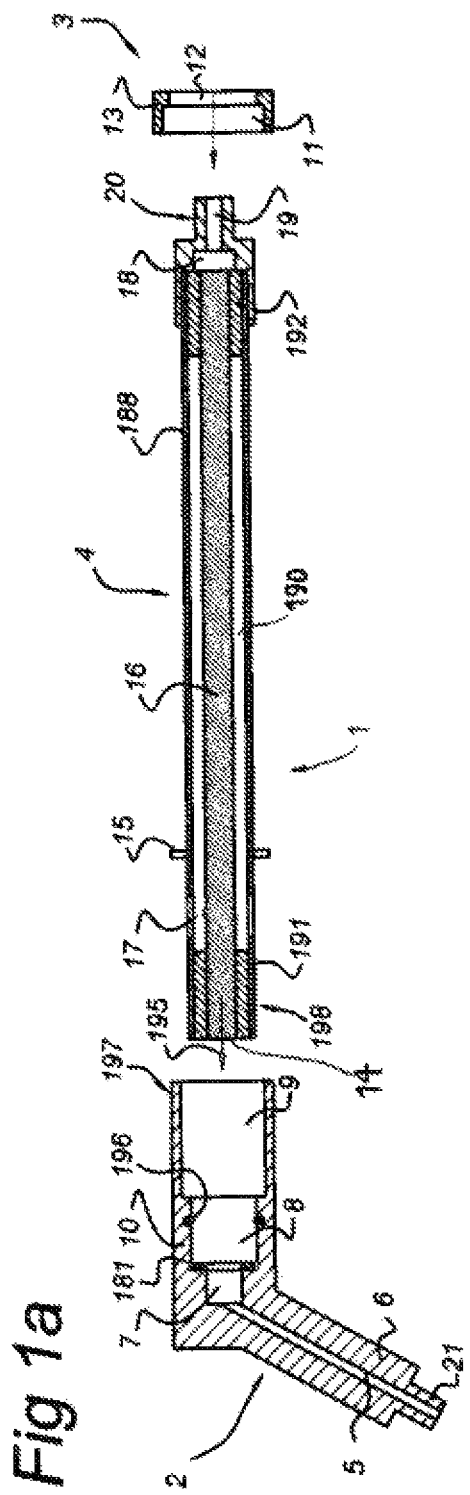
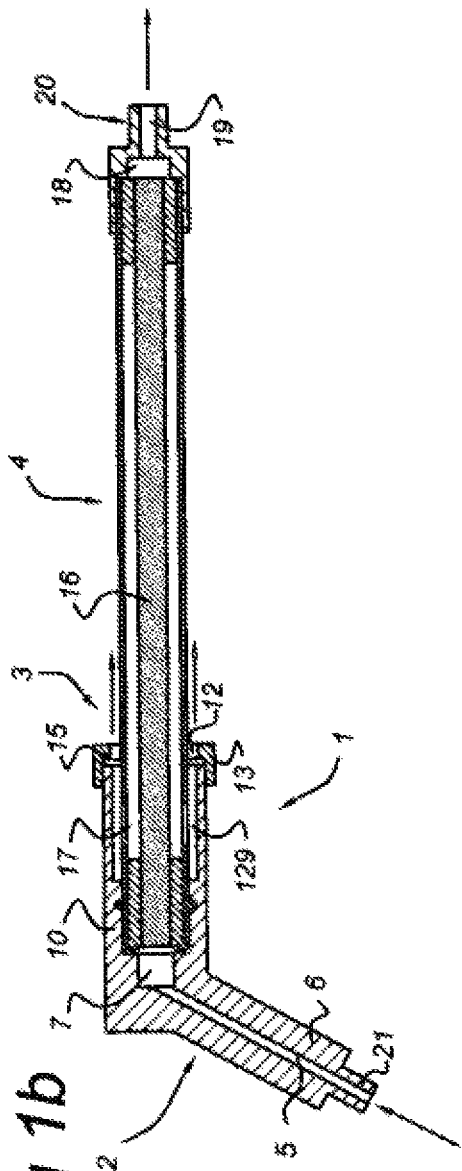

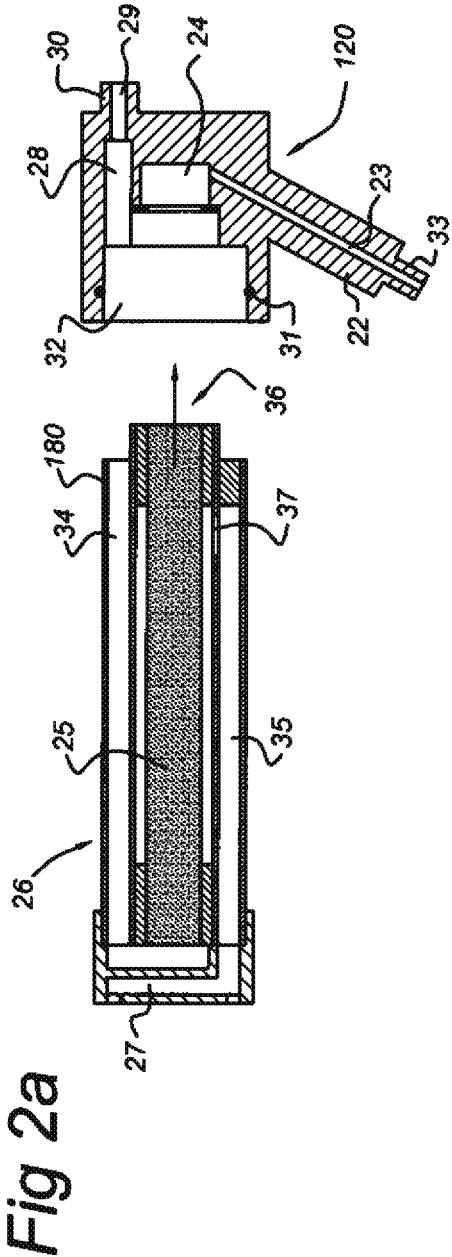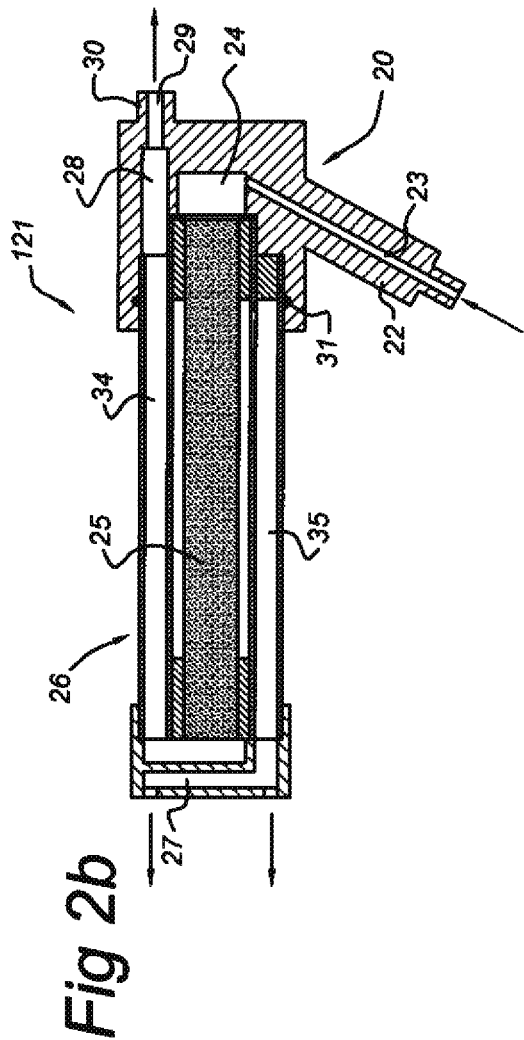

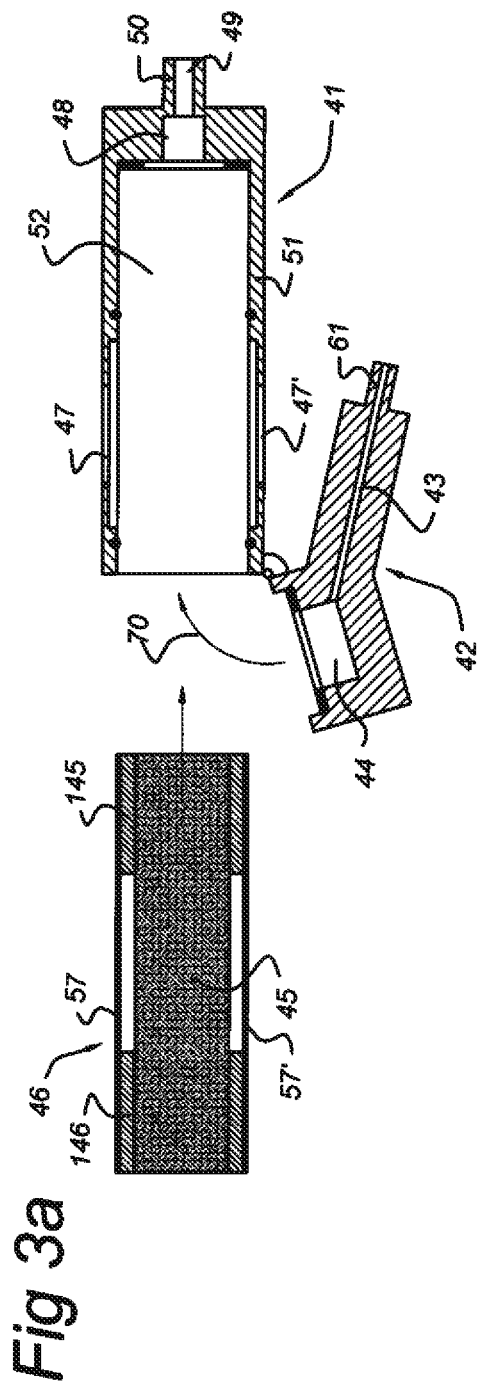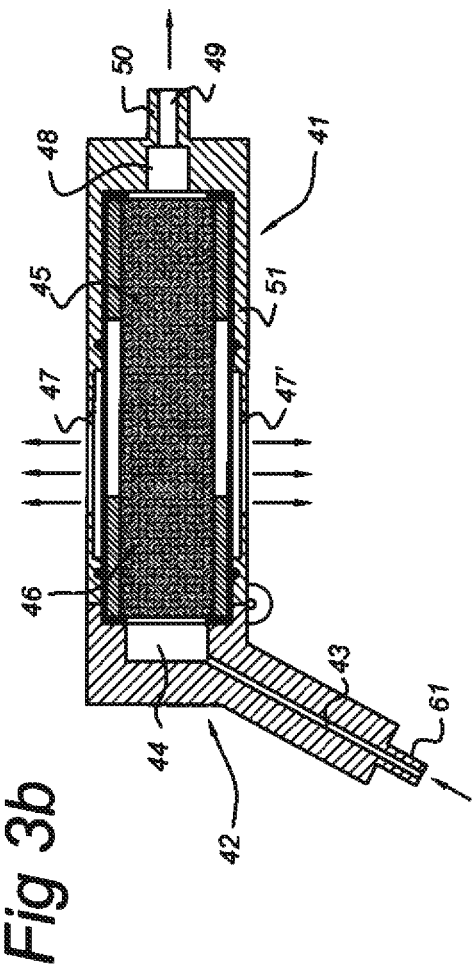
Fig 3a
Fig 3b

FILLING PISTOL AND METHOD FOR FILLING AN OBJECT ESSENTIALLY WITH NITROGEN

CROSS REFERENCE TO RELATED APPLICATIONS

This application is continuation of copending International Application No. PCT/NL2009/050743, Dec. 8, 2009, which designated the United States, the disclosures of which are incorporated herein by reference, and which claims priority to Netherlands Patent Application No. 2002301 filed Dec. 8, 2008.

SUMMARY OF THE INVENTION

The invention relates to a filling pistol, in particular a filling pistol for filling an object essentially with nitrogen. The invention also relates to a method for filling an object essentially with nitrogen.

A method is known from EP 1 745 835 for filling an object and a fixed filling device, with which the object can be filled with nitrogen, wherein a fixed filling device is produced which, for example, is mounted on a wall, wherein the filling device can be arranged to fill an object via a hose with a gas, wherein a filter which is permeable to nitrogen and which can capture other components in air is incorporated into the hose. Air can be compressed in the filling device and can be fed via the hose and a valve of, for example a tyre, into the tyre. The pressure can be controlled with the filling device.

A problem of the known device and method is that the costs for purchasing a filling device of this type are high. In addition, the replacement costs are high for the nitrogen separation device. An object of the present invention is to solve at least one of these problems.

This object is achieved with a filling pistol which is arranged to fill an object such as a tyre with nitrogen, wherein the filling pistol has a feed-in connection for air which can preferably be connected to an air source and, in particular, a compressor. A filling pistol is thus obtained which, for example, can be connected to a central air compressor via a pressure hose suitable for this purpose. This makes it possible to work at one workstation with one air source to which a plurality of filling pistols can be connected. As a result, the purchase costs are substantially reduced.

The filling pistol comprises a housing in which and with which the various components of the filling pistol are accommodated and connected. A separation device, inter alia, can be accommodated in the housing, with which essentially nitrogen-rich gas can be obtained. The separation device is incorporated into a channel which is connected to the inlet opening. The separation device is located downstream of the inlet opening. The introduced air is fed through the separation device. An outlet opening which, for example, is connected via a channel to the separation device, is located downstream of the separation device, said connection opening being connectable to an object which is to be filled. The outlet opening can be connected via an attachment or intermediate connection to an object. The connection may run, for example, via a valve and a valve connection adapted to it which is connected via a hose to the outlet opening. The outlet opening allows the outlet opening to be connected to the object, possibly via an attachment.

In one embodiment, the filling pistol has an exchangeable separation cartridge, in which the nitrogen separation device is accommodated. The separation device can thereby be disconnected from the filling pistol and are easily replaceable.

The separation cartridge has an air inlet and a nitrogen outlet and, in one embodiment, a residual gas outlet. The separation device is preferably disposed between the air inlet and the nitrogen outlet of the separation cartridge. Residual gas can be removed via the residual gas outlet. The separation cartridge is easily exchangeable and can be connected to or accommodated in the housing of the filling pistol. The separation cartridge is accommodated in the channel of the filling pistol, between the air inlet connection and outlet. The separation cartridge is inserted in between.

The filling pistol is preferably provided with an operating element which is arranged to set the filling pistol to an operating condition in order thus to supply the object with nitrogen-rich gas. The operating element can be connected to a valve connected thereto, which is operable via the operating element and can be switched from a closed to an open position. An open connection will thereby be established between the inlet opening and the outlet opening through which air and ultimately nitrogen-rich gas can be introduced into the object.

With a filling pistol according to one embodiment, a filling pistol is obtained which can be connected to a central compressor and with which it is possible to work at a short distance from the object which is to be filled, wherein the user has a greater ease of use and, in particular, the connection to the object can be established and released more quickly before and after filling. The operating speed is thereby increased. In addition, the design of the filling pistol with the operating element offers a great advantage.

The filling pistol is preferably arranged as an easy-to-use filling pistol, wherein, for example, the operating element is arranged as a trigger. The trigger is operable with one finger of the user. The trigger can be combined with a handgrip, wherein the ease of use and the operating simplicity of the device are further increased.

In one preferred embodiment, the separation cartridge is a detachable housing part. The detachable housing part can also be replaced. The replaceable housing part may, for example, be a plastic attachment incorporating the separation device. The detachable housing part comprises an air inlet and a nitrogen outlet of the separation device, and is connected to an outlet opening which, in one embodiment, is similarly disposed on the detachable housing part. The air inlet can be connected to a channel in the central housing part of the filling pistol. As a result, a suitable fast connection can be used. The detachable housing part is prepared for this quick fastening.

According to one embodiment, the filling pistol is provided with a screw thread connection to connect the separation cartridge to the filling pistol therewith. The one housing part is provided with a number of inset grooves and radial grooves, whereas the other housing part is provided with a cam which can be fitted into the inset grooves and can then be twisted and accommodated in the radial groove. This makes it possible to connect the separation cartridge to the filling pistol. In one embodiment, the connection comprises a bayonet fitting.

The separation cartridge preferably comprises a housing part of the filling pistol which comprises the outlet opening. This enables a compact design of the central housing part with less material and fewer components.

The filling pistol preferably comprises an accommodation area in which the exchangeable separation cartridge can be detachably accommodated with an air inlet and a nitrogen outlet. A filling pistol is thus obtained which has a replaceable separation cartridge. By accommodating the separation cartridge in the housing, the separation cartridge is surrounded by housing parts and can be accommodated, for example, in a channel suitable for this purpose.

In one embodiment, the filling pistol has an accommodation area in the form of a barrel, in which a separation cartridge formed by a cylindrical part can be accommodated. The separation cartridge can be fixed into the accommodation area and can be detached when it needs to be removed. In one embodiment, an ejection mechanism is provided to move the separation cartridge out of the accommodation area.

In one embodiment, the filling pistol has at least two interconnected and hinged housing parts to accommodate a separation cartridge between them. By moving the housing parts away from each other, an accommodation area can become accessible, in which the separation cartridge can be accommodated, and the separation cartridge accommodated therein can be fixed to the housing parts by bringing together and connecting and fixing and, in particular, locking together the hinged housing parts.

A power source, such as a battery, which can be connected to a switch or drive, can preferably be accommodated in the housing of the filling pistol. In one embodiment, a compressor is accommodated in the housing. The compressor can be connected to the battery and can thus be switched on if the user wishes to use the filling pistol. The compressor is a component of the filling pistol. The outlet of the compressor is connected to the inlet openings of the filling pistol in order to thereby feed the air to the separation device in the separation cartridge. The compressor can be operated with the operating element. A suitable control switch, which a person skilled in the art can provide, can be accommodated in the filling pistol.

In one embodiment, the housing has a presentation unit such as a display or a screen on which a message can be visualized by means of a graphics driver suitable for this purpose. The presentation unit can be connected to a processing means such as a processor which can be controlled by means of, for example, measuring sensors which emit a signal comprising a parameter representing the measured unit; the processing means can process this and send it to the presentation means for presentation thereof. As a result, the user can obtain information on the operation of the filling pistol. In particular, the instantaneous gas pressure in the filling pistol can be displayed. In one embodiment, the current pressure in the object which is to be filled is displayed.

A feedback connection is preferably incorporated into the filling pistol. The feedback connection connects the outlet opening, for example, to a measuring sensor. The pressure at the outlet opening and therefore the pressure in the object can thereby be measured with the measuring sensor. A feedback can thereby take place between, for example, a required pressure and the instantaneous pressure in the object which must still be adjusted until the required pressure is obtained. The person skilled in the art will be familiar with the design of a switch for the corresponding switching of the filling pistol. An input mechanism can be disposed on the filling pistol, on which a required pressure can be specified. The required pressure is processed by the processing means and is compared with the measuring signal obtained from the measuring sensor, wherein the filling or emptying via the return can be permitted and can be controlled by the processing means. The processing means is connected to the various control elements which are accommodated in the filling pistol, such as a feed valve with which the feed of air and ultimately nitrogen to the object can be controlled, and a valve which is incorporated into the feedback line, with which filling can be released from the object.

In one advantageous embodiment, the feedback channel is incorporated into the housing part of the separation cartridge. The measuring sensor for measuring the pressure in the object to be inflated is preferably incorporated into the central housing part and has a gas-tight connection via the feedback channel to the object and can thus measure the pressure. A filling pistol is thus obtained which has a measuring sensor which can measure the pressure in the object via replaceable housing parts. Costs are reduced by accommodating the measuring sensor in the central re-usable housing.

In one embodiment, a one-way valve is incorporated near the outlet opening of the filling pistol in the channel which allows nitrogen-rich air through to the outlet opening. This prevents gas from being fed out from the object back through the membrane for nitrogen separation if the pressure in the nitrogen feed channel is lower than the pressure in the object and the pressure in the outlet. The connection to the feedback channel is established upstream of the one-way valve.

In one advantageous embodiment, the one-way valve is incorporated into the housing part of the separation cartridge.

In one embodiment, an orifice is used which can be integrated with the one-way valve. The product volume is to be defined by means of the correct dimensioning of the orifice.

The separation cartridge preferably comprises hollow-fibre membranes which are suitable for separating nitrogen from air. The assembled membrane is surrounded by a chamber. Other parts of supplied air can escape from the membrane and can reach the chamber. The remaining air can be removed via the chamber, for example from the housing of the filling pistol or from the housing part of the separation cartridge to the outside air.

One advantageous embodiment comprises a separation cartridge which is provided with recognizable identification. The filling pistol comprises an identification unit which is arranged to enable the identification of the separation cartridge. If the identification of the separation cartridge does not match a pre-programmed parameter, the filling pistol can be or can remain switched off. It can thereby be ensured that suitable separation cartridges are used.

It is also possible to track the usage period of a separation cartridge by means of the identification, and to alert the user if a separation cartridge is approaching its maximum useful life. In one embodiment, the filling pistol will be switched off if the maximum useful life is reached. The maximum useful life can be incorporated, for example coded, into the identification of the separation cartridge, so that the filling pistol can also operate with new separation cartridges with longer useful lives.

A number of embodiments of the present invention will be explained in detail with reference to a description of figures. It should be clear to the person skilled in the art that the embodiments shown in no way limit the scope of protection, which is defined in the claims. The invention is described with reference to a number of advantages. Each of these advantages may comprise a patentable invention. Implicit advantages of specific embodiments will also be obvious to the person skilled in the art. Each of the implicit advantages and the associated measure(s) can also form a basis for a patentable invention according to the application or according to a divisional application.

BRIEF DESCRIPTION OF THE DRAWINGS

In the figures:

FIG. 1a shows a side view of a housing, a cap and a separation cartridge for a filling pistol according to one embodiment of the present invention;

FIG. 1b shows a side view of the filling pistol according to FIG. 1a in a connected condition;

FIG. 2a shows a side view of a filling pistol and a separation cartridge for a filling pistol according to one embodiment of the present invention;

FIG. 2b shows a side view of the filling pistol according to FIG. 2a in a connected condition;

FIG. 3a shows a side view of a filling pistol in an open condition with a separation cartridge according to one embodiment of the present invention;

FIG. 3b shows a side view of the assembled filling pistol according to the embodiment shown in FIG. 3a;

DETAILED DESCRIPTION OF THE PREFERRED EMBODIMENT

Figure 4:
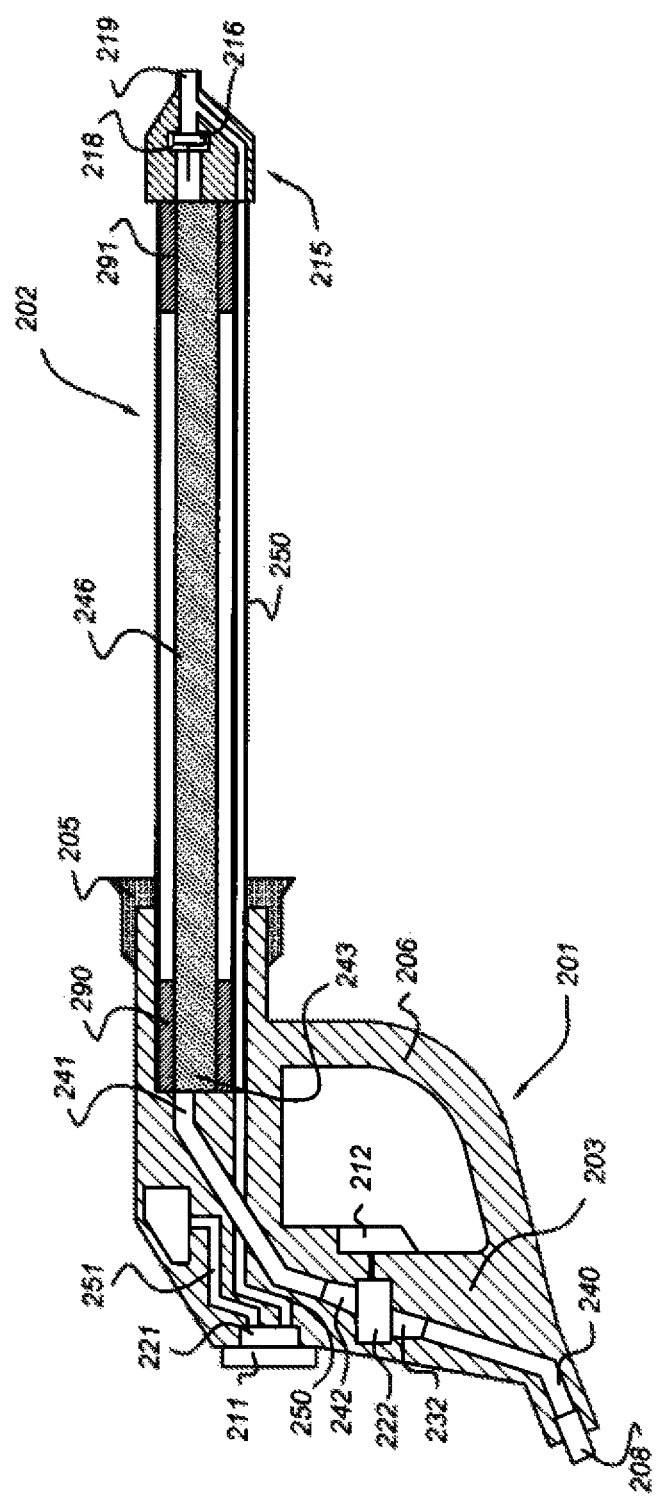
FIG. 4 shows a cross-section view of an embodiment of a filling pistol.

FIG. 1a shows a side view of a housing 2 of a filling pistol, a cap 3, and a separation cartridge 4. FIG. 1b shows the various components in a connected condition of the filling pistol 1.

The housing 2 shown in FIG. 1a comprises a handgrip 6, and a central housing part 10. A connection 21 is provided on one underside of the handgrip 6. The connection can be used, for example, to connect an air feed hose to the filling pistol. The air feed hose can be connected to an air source, preferably an air source which can provide air under relatively high pressure, such as, for example, an air compressor.

In a different embodiment, a compressor can form part of the filling pistol 1 and can be incorporated into the housing 2. A feed is then also provided. When the filling pistol 1 is used/operated, the internal or external compressor will be switched on and will, for example, draw in outside air. The compressed air will then be fed to the connection 21. This design can be combined with one of the other advantageous measures from this description.

An air feed-through system 5,7,8,9 is provided in the handgrip 6. The air feed-through system comprises an air supply 5, a first area 7, a housing chamber 8 and a second area 9. In an assembled state of the filling pistol 1, the system is airtight in order to prevent any loss of pressure. Supplied air can be brought via the air feed-through system to an outlet 20 in order to be fed thereby into an object.

The cap 3 shown in FIG. 1a comprises a stop area 11 and a feed-through opening 12. The cap 3 can be provided with a suitable internal screw thread, with which the cap 3 can be screwed onto the end 197 of the housing part 10. Neither of the screw threads is shown in FIG. 1.

The separation cartridge 4 shown in FIG. 1a comprises a housing part 188 with a separation device 16 in the form of a membrane. The housing part 4 has a feed-in opening 14. The housing part 188 can be connected to the housing part 2 in order to form together the filling pistol 1.

The separation cartridge 4 comprises separation device 16 (not shown in detail) for the separation therewith of essentially nitrogen and oxygen from air. A suitable separation device is known, for example, from EP 0 298 531, said publication being included in its entirety by way of reference in this description.

The separation device 16 preferably comprises a multiplicity of hollow-fibre membranes. Each hollow-fibre membrane has a wall. The fibres together form a membrane 16. The hollow fibres are inserted into sleeve parts 191, 192. The assembled membrane 16 thus extends from the inlet opening 14 to the outlet 18. The membrane 16 is surrounded by a cylindrical void 190. The membrane 16 is held in the cylindrical housing 188 by sleeve parts 191, 192, which surround the membrane near the ends and thereby hold it in place, wherein the sleeve parts 191, 192 are connected to the surrounding housing part 188 and are thereby held in the respective positions. In the embodiment shown in FIG. 1, the hollow-fibre membrane 16 forms a channel, wherein oxygen-enriched air penetrates the wall of the membrane 16 and is fed out via the outlet 17 to the outside air, and wherein nitrogen-enriched air is fed towards the outlet 20.

An outlet 20 with an outflow opening 19 is provided on one end of the module 4. The outlet 20 can, possibly with the aid of an adapter hose, be fitted to a valve of, for example, a car tyre.

FIG. 1b shows how an O-ring 196 is incorporated into the housing, in a recess formed for this purpose, which O-ring, on bringing the proximal end 198 of the separation cartridge 4 into the housing area 9 and the area 8 in the direction designated by arrow 195, will connect to an external surface of this proximal end 198 and will thereby form an airtight connection. The air feed-through system 5,7,8,9 is thereby rendered airtight. From the area 9, there remains an area 129 via which a connection is established with the outside air.

A seal 181 is incorporated into the housing 2 to adjoin the proximal end 198 of the separation cartridge 4 and, in particular, the sleeve part 191. By means of the seal 181, it is ensured that a good connection is established with the sleeve part 191. This sleeve part, but also the cylindrical housing part 188, may shrink during manufacture. A flexible seal 181 prevents gas leaks. As will be described below, the proximal end 198 is pressed onto the seal, wherein sealing is ensured.

Although not shown in the simplified representation of the filling pistol 1 according to this first embodiment, possible additional operating and control elements can be fitted to the filling pistol 1, such as a battery, a pneumatic circuit, an operating element such as a trigger or a different button, a read-off display and possible control circuits. These will be discussed with reference to the embodiment according to FIG. 4, but can also be used in this first embodiment.

In a connected condition, the cap 3 is pushed over the separation cartridge and is then connected in a known manner, such as, for example, with a screw-thread connection, to the central housing part 10. In a different embodiment, a bayonet fitting is used.

The part of the casing of the separation cartridge 4 which is located between the housing chamber 8 and the closure part 15, together with the internal casing of the second area 9, forms a smaller area 129 compared with the second area 9. A different embodiment can be achieved by locating a flange 15 beyond the permeate opening 17, wherein separated air flows directly out from the separation cartridge 4.

The residual product, in most cases air enriched with oxygen [30-35% oxygen, 65-70% nitrogen] and/or other non-nitrogen components of air which have left the membrane 16, can be removed via the cylindrical void 190, leaving the housing via openings 17. In the assembled state as shown in FIG. 1b, the openings 17 are connected to the chamber 9 and, via the air openings 194 in the flange 15, are connected to the outside air. The separated air can therefore be removed.

Since the fibre walls of the separation device is porous, the surface layer of the fibre ensures that the pressure within the fibre is slightly decreased and a pressure prevails outside which is slightly above atmospheric pressure. A closure part 15, which is formed as a flange extending radially outwards, is fitted to one external side of the housing part 4. The closure part 15 is provided with an air opening 194. The closure part 15 is accommodated in the area between the housing part 2 and the housing part 3 and is thus held in place. By connecting the flange 15 between the housing parts 2 and 3, the entire housing part 4 is held and possibly locked in its position.

The separation cartridge 4 is positioned in a connected condition in such a way that a continuous channel connection is possible from the connection opening 21 in the downstream direction to the outlet opening 19. Here, the flow runs from the connection opening 21 to the first area 7 via the connection 14 through the membrane 16 to the outlet 20.

The term "downstream direction" therefore refers to the path of an air particle, passing from the connection opening 21, via the air feed 5, towards the outlet opening 19. The term "upstream" means the opposite direction to the downstream direction, i.e. the direction from the outlet opening 19 to the connection opening 21 via the air feed-through system.

The operation of the filling pistol 1 shown in FIG. 1*d* is as follows. Air, preferably compressed air, is provided and can be fed via a hose connected to the connection 21 into the filling pistol 1. An operating element can be provided on the housing 2, for example on the handgrip 6, for this purpose. The operating element can ensure that a valve (not shown) in, for example, the air feed 5 or the first area 7 is controlled in such a way that air can flow into the filling pistol 1.

Ambient air is preferably used here, i.e. air with a nitrogen percentage of approximately 78% and an oxygen percentage of approximately 20.9%. The air is preferably compressed to a pressure of, for example, 8 bar. In one embodiment, pressure control means can be incorporated into the filling pistol 1 to control and set the supplied pressure. This may be an adjustable throttle valve.

The air will be fed by the air feed 5 via the first area 7 to the inlet 14 of the separation cartridge 4. With separation device 16, essentially oxygen is separated from nitrogen out of the supply air. The oxygen will be fed outside via outlets 17 and possibly the smaller area 129. The nitrogen will furthermore be fed through the central chamber 16, ultimately leaving the filling pistol 1 via the outflow opening 19 of the outlet 20. It is not necessary for the separation device to ensure a 100% separation.

If the outlet 20 is fixed to a valve, an inflatable object, such as, for example, a tyre, can be pressurized, wherein the gas in the object is essentially nitrogen-rich gas.

The air fed into the filling pistol is preferably ambient air which has previously been pressurized. The air comprises approximately 78% nitrogen and approximately 20.9% oxygen. A part of the oxygen present in the air will be separated in the separation cartridge 4. In this way, the percentage of nitrogen in the air fed out will be higher. It is thus possible that the air fed out from the outlet, and therefore the gas fed into the object, comprises at least approximately 90% nitrogen. The gas fed out preferably comprises at least approximately 95% nitrogen.

During the use of the filling pistol 1, the separation device 16 may become contaminated in the separation cartridge 4, for example due to, for example, dust or oil particles which are present in the supply air. The operation of the separation device is then no longer guaranteed, as a result of which the percentage of nitrogen in the air for the object which is to be filled may decrease. In such a case, it is possible to replace the separation cartridge 4.

As already described above, the separation cartridge 4 is detachably connected to the housing 2. The contaminated separation cartridge 4 can be replaced by a new module. Following the replacement of the separation cartridge 4, the separating effect of the filling pistol is again guaranteed, wherein objects such as tyres can essentially be filled once more with nitrogen.

A measuring device can be provided in the separation cartridge 4. The measuring device can be connected to a read-out device provided on the housing. The read-out device can display information from the measuring device to the user. The measuring device can be arranged to measure, for example, the pressure of the object which is to be filled.

In addition, the measuring device can be arranged to control the separating effect of the separation device. It is possible, for example, to measure the percentage of nitrogen in the air fed into the tyre. This percentage can be displayed on the read-out device. It is also possible to display a warning signal to the user if the percentage of nitrogen falls below a specific lower-limit value. The user thus knows that the separation cartridge is no longer operating effectively and needs, for example, to be replaced.

It is also possible to measure and display the usage times. With this, the user can be warned that a module 4 needs to be replaced. In one embodiment, the filling pistol can be switched off/disabled at the end of a useful life of a separation cartridge 4.

In one embodiment, a measuring device can be fitted in the chamber 9', wherein the measuring device is connected to the housing part 2. The measuring device can 'sniff at' the separated gases which escape via the openings 17. This makes it possible to determine, with reference to the composition of the separated gases, whether the separation device 16 is still functioning properly.

In one embodiment, the measuring device can be connected to an operating element. If the measuring device signals that the operation of the separation device is insufficient, the operating element can be blocked.

In one embodiment, the separation cartridge 4 is provided with an identification. The housing 2 is provided with identification means to read the identification. If the identification does not match a pre-programmed identification, the operation of the filling pistol can be blocked. It is hereby ensured that a correct and, for example, approved or safe separation cartridge is connected to the housing part 2 to form the filling pistol 1. The identification-reading means can be connected in a manner familiar to the person skilled in the art to a switching mechanism to operate the filling pistol 1 in such a way that the operation can be blocked.

In the embodiment according to FIG. 1, the feed of air can be controlled with an operating element (not shown) connected to a valve (not shown).

FIG. 2*a-b* show a second embodiment of a filling pistol 121. The filling pistol comprises a housing 120 (shown in FIG. 2*a*) and a detachable separation cartridge 26 (FIG. 2*b*). An assembled state of the filling pistol 121 is shown in FIG. 2*c*.

The housing 120 shown in FIG. 2*a* comprises a handgrip 22 and a central housing part 31. A connection 33 is provided on the handgrip 22. In an inner part of the connection 33 and the handgrip 22, an air feed 23 is provided which emerges into a first area 24. A housing chamber 32 is provided on a rear side of the housing 120 in the central housing part 31. On an upper side of the central housing part 31, the housing chamber 32 is connected via a second area 28 to an outlet 30 with an outlet opening 29.

The separation cartridge 26 shown in FIG. 2*a* comprises a housing part 180 with a membrane 25 to separate nitrogen from air. The membrane 25 has an inlet opening 36. A nitrogen line 34 and an oxygen line 35 are provided at a radial distance from the membrane 25. In the embodiment shown, the nitrogen line 34 is provided on an upper side of the housing, and the oxygen line 35 is provided on an underside of the housing. The nitrogen line 34 and the oxygen line 35 are only connected via the central chamber 25, i.e. no direct connection exists between the two lines. A feed-through chamber 38 is provided between the membrane 25 and the nitrogen line 34. An opening 37 is provided between the membrane 25 and the oxygen line 35. The oxygen line runs from the opening 37 towards an oxygen outlet chamber 27, which is provided with two outlet openings.

In a connected condition, as shown in FIG. 2b, it can be seen that the inlet opening 36 of the separation cartridge 26 is located in the housing chamber 32 of the central housing part 31 of the housing 120. The separation cartridge 26 is preferably connected using a fixed fitting to the walls of the housing chamber 32. In this way, the separation cartridge will be able to be firmly attached to the housing 120. Additional means for the firm connection of the separation cartridge 26 to the housing 120 can be formed by a clamp or lock which can be placed by the user on and over the separation cartridge 26.

The separation cartridge 26 is positioned in a connected condition in such a way that a continuous connection is possible between the air feed 23 and the outlet opening 29, via the first area 24, the membrane 25 and the nitrogen line 34, to feed essentially nitrogen via the outlet 30 to an object which is to be inflated, such as a tyre.

In a preferred embodiment, the separation cartridge 26 and the housing area 32 arranged for it are elliptical-shaped in cross-section. The separation cartridge can thereby be positioned in a simple manner in the housing area 32 and an incorrect connection is prevented.

The O-ring 31 is incorporated into a wall of the inner area 32 and, with the separation cartridge end 180 placed in position, will adjoin the external casing of the housing 26 to form an airtight connection.

The operation of the filling pistol 121 shown in FIG. 2b is analogous to the operation of the filling pistol 1 shown in FIG. 1b. Air, preferably compressed air under pressure, can be fed into the filling pistol by connecting suitable means to the connection 33. It should be noted that, in this embodiment also, an operating element can be provided on the housing 120 to feed air therewith into the filling pistol 121. The air will be fed by the air feed 23 via the first area 24 and the inlet 36 into the membrane 25 of the separation cartridge 26. The separation of oxygen and nitrogen from the supplied air is carried out in the membrane 25. Essentially oxygen will be fed to the outside via the opening 37, the oxygen line 35 and the oxygen outlet 27. The nitrogen will furthermore be fed through the membrane 25, ultimately leaving the filling pistol 121 via the nitrogen line 34 and the outflow opening 29 of the outlet 30. An inflatable object, such as, for example, a tyre, can be pumped up in this way.

One advantage of the second embodiment compared with the first embodiment is the fact that the separation cartridge has no outlet 30, but the outlet 30 is fitted to the housing part 120. It is furthermore advantageous in this embodiment that the nitrogen-rich gas can be formed and thereafter can be fed once more through the central housing 120. Electronics provided in the housing part 120 can perform measurement on the nitrogen-rich gas and thereby, for example, control the correct functioning of the gas separation.

In the embodiment shown in FIG. 2, the separation cartridge 26 can be provided with an identification and the central housing part 120 can be provided with reading means therefor. This can serve to monitor the amount of operating time that a separation cartridge 26 has had and to determine whether or not its useful life has ended. The central housing part 120 can be blocked if the useful life has been exceeded.

In a further embodiment, gas separation device 25 can also be fitted in the channel 34 near the end 180. A longer separation channel can thereby be formed, and the separation can take place in a more effective manner.

In the embodiment according to FIG. 2, the feed of air can be controlled with an operating element (not shown) connected to a valve (not shown).

FIG. 3a-3b show a third embodiment of a filling pistol 41.

FIG. 3a shows the filling pistol 41 in an assembled state. The filling pistol 41 comprises a handgrip 42 which is connected to a central housing part 51. A connection 61 is provided on one underside of the handgrip. The filling pistol 41 comprises a handgrip part 42 and a foremost part 51, which are connected by means of a hinge 55. An outflow opening 47 for oxygen is provided in a side wall of the foremost part 51. The foremost part is also provided on a front side thereof with an outlet 50 with an outlet opening 49.

A separation cartridge 46 can be accommodated in the housing part 51. The separation cartridge 46 comprises a separation device 45 for separating oxygen and nitrogen. A side wall of the separation cartridge 46 is provided with an opening 57. The separation device 45 comprises hollow fibres which are housed in sleeve parts 145, 146 and are thus positioned in the housing of the separation cartridge.

In the connected condition shown in FIG. 3b, the opening 57,57' is aligned with the outflow opening 47,47'. Oxygen-rich air which is separated in the membrane 45 leaves the filling pistol via the outflow opening 47,47'.

On an inner side of the handgrip, an air feed 43 is provided which is connected to the first chamber 44 provided in the central housing part 51, 60. In a connected condition, the first chamber 44 is connected to a feed opening 62 of the separation cartridge 46.

The operation of the filling pistol 41 shown in FIG. 3b is analogous to the operation of the filling pistol 1 shown previously in FIG. 1b and FIG. 2b. Air can be fed into the filling pistol by connecting suitable means to the connection 61. It should be noted that, in this embodiment also, an operating element can be provided on the housing 41 to feed air therewith into the filling pistol 41. The air will be fed by the air feed 43 via the first area 44 into the feed opening 62 of this separation device 45 of the separation cartridge 46. The membrane 45 allows oxygen to escape to the outside via openings 57,57' and outlets 47,47'. The nitrogen will furthermore be fed through the membrane 45, ultimately leaving the outflow opening 49 of the outlet 50. In this way, an object can be provided with nitrogen-rich gas. It is thus possible, for example, to provide a tyre, such as a car tyre, essentially with nitrogen-rich gas, and thereby bring the tyre to the correct pressure.

In a different embodiment, comparable with the embodiment according to FIG. 2 or 3, the separation cartridge is connected in a vertical direction to the central part. It is thereby possible to reduce the distance between the user who holds the handgrip 22,42 and the outlet 20,50, wherein the user, for example, can carry out actions more quickly with the object which is to be filled, such as establishing and releasing the connection thereto.

The handgrip housing part 42 is connected by means of a hinge 55 to the foremost part 51. As is clearly shown in FIG. 3a-3b, the rearmost housing part 42 can thereby be hinged in relation to the foremost part 51 according to arrow 70. With the hinging of the filling pistol 41, the separation cartridge 46 is moved into a position such that it can be removed from the foremost part 51. As clearly shown in FIG. 3a, the foremost part 51 comprises a housing area 52 to accommodate the separation cartridge 46 therein.

The separation cartridge 46 can be pushed with a fixed fitting into the housing area 52. The rearmost housing part 60 can then be hinged back towards the foremost part 51. The two housing parts 42, 51 can be fixed with suitable means, such as, for example, a click mechanism. In this way, the separation cartridge sits securely in the central housing part 42, 51. The membrane is thus less susceptible to damage.

In the embodiment according to FIG. 3, the feed of air can be controlled with an operating element (not shown) connected to a valve (not shown).

FIG. 4 shows a view in cross-section of a filling pistol 201. The filling pistol comprises a housing 203 and a separation cartridge 202, which is attached with the aid of a screw cap 205 to the housing 203. The housing 203 is provided with a handgrip 206. The housing is provided on an underside with a connection 208 for the connection thereto of an air source under pressure, such as, for example, an air compressor. A first feed line 240 connects the connection 208 to an incoming connection 232 of a regulator 222 of the supply air. The regulator may, for example, be a 2/2 valve. A valve of this type has two connections and two control positions. In the present case, the control positions comprise an on position and an off position. A valve of this type has a relatively simple technical design, and is therefore relatively inexpensive.

Other embodiments of the regulator 222 are of course conceivable. The regulator is connected to an operating button 212 provided on the housing. An outgoing connection 242 of the regulator 222 is connected to a second feed line 241 with an inlet connection 243 of the separation cartridge 202.

The inlet connection 243 merges in the membrane 246 of the separation cartridge 202. The membrane 246 forms a separation device for obtaining essentially nitrogen-rich gas. The membrane 246 is positioned by means of sleeve parts 290,291 in the cylindrical housing of the separation cartridge 202, comparable with the first embodiment according to FIG. 1.

An outflow mouth 215 with a schematically shown one-way valve 216 is provided on the end of the membrane 246 located opposite the inlet connection 243, i.e. downstream. The one-way valve 216 is movably fitted into the outflow mouth part 215. The outflow mouth 215 has a chamber 218. The chamber has an outflow opening 219, which is connectable to an object which is to be filled. A component of the one-way valve 216 may be an orifice, with which a constant flow to the product can be obtained. It is thereby ensured that the nitrogen removal via the outflow mouth 215 has a maximum, said maximum being less than the maximum separation capacity of the membrane.

The orifice can also be incorporated into other embodiments. The orifice is preferably integrated into the gas flow towards the outlet, just downstream of the separation device. The required gas-flow control, in particular limitation, is thereby achieved.

The chamber 218 is also provided with a connection for a return line 250, which runs back from the chamber 218 along the separation cartridge 202 towards the housing 203. The return line 250 is connected in the housing 203 to a regulator 221 for vented air. The regulator is also connected to a venting button 211 provided on the housing. The regulator is furthermore provided with a venting line 251. The regulator 221 may comprise a pressure sensor to measure the pressure in the return line 250.

The operation of the filling pistol 201 shown in FIG. 4 is as follows. The outflow opening 219 can be connected to an object, for example, to a valve of a car tyre. An additional filling hose can possibly be used to connect the outflow opening 219 to the valve. The tyre can then be provided with nitrogen-rich gas. To do this, the user must press the operating button 212. The regulator 222 is then put into operation, as a result of which supply air flows via the connection 208 and the first and second feed lines 240,241 to the separation cartridge 202. Nitrogen-rich gas is obtained in the membrane 246 of the separation cartridge 202 by separating off oxygen. The nitrogen-rich gas then reaches the outflow mouth 215. Due to the pressure of the nitrogen-rich gas, the one-way valve 216 is moved in the downstream direction towards the outflow opening 219. The outflow mouth 215 will thereby be able to allow the nitrogen-rich gas to pass through, to flow towards the chamber 218 and then via the outflow opening 219 into the object which is to be filled, such as a tyre.

If the operating button 212 is released, pre-tension means (not shown) will push the button back into the original position. The regulator 222 for supply air will thereby ensure that no more air is supplied.

If the filling pistol 201 is connected to the object which is to be filled, and no more air is supplied to the object which is to be filled, the air in the object will flow back into the filling pistol 201. The air flows via the outflow opening 219 into the chamber 218. Due to the pressure build-up in the chamber 218, the one-way valve 216 will be pushed upstream and will then close the outflow mouth 215 in the downstream direction towards the membrane 246. Return flow of the air via the separation cartridge 202 is thereby rendered impossible. However, it is possible for the air to flow via the return line 250. The pressure of the air in the return line can be measured at the location of the regulator 221 by means of a pressure sensor. In this way, the pressure in the object during the filling process can be kept under control.

If the object which is to be filled is provided with an excessive pressure, this pressure must be vented in a controlled manner. The venting button 211 is provided for this purpose. When this button is pressed, the venting regulator 221 is put into operation. It will then be possible to release the air via the return line 250, the inner part of the regulator 221 and the venting line 251. The air is vented. It is also possible to provide a venting opening in the housing 203. The venting line 251 can be connected thereto.

The embodiment according to FIGS. 1 and 4 offers the advantage that the user can use it in a standing position. This is advantageous for the working conditions. Furthermore, the barrel of the separation cartridge 4, 202 offers a gripping point for the user. This has a user-friendly effect. In addition, the model, as a tool with a trigger part and a barrel, is comparable with other tools used in a workshop, and will therefore be user-friendly.

All of the detailed designs shown in FIG. 4, such as the control unit, sensor, identification, can be used in the designs according to FIG. 1-3 with comparable advantages.

The filling pistols 1,121,41 shown in FIG. 1-4 can be connected to a centrally located compressor device. A suitable flexible hose can be attached with one end to the connections 21,33,61, and with the other end to an air outlet of the compressor device. More than one filling pistol can be connected to the central compressor device. The filling pistols are to be used independently from one another. Since a filling pistol is provided with an operating element, each filling pistol can be put into operation at any required location. The position of the filling pistol in relation to a central compressor is not important here. The central compressor does not have to be within reach in order to be able to use the filling pistol.

In each of the embodiments, it is possible to carry out a pre-filtration of the supplied air at the inlet 21,33,61. The supplied air is thereby pre-cleaned and the cartridge will become contaminated less quickly. In one embodiment, a pre-filtration unit is incorporated into the central housing of the device and the useful life of the separation cartridges is thus increased.

It should be obvious to the person skilled in the art that the present invention is not limited to the above description, and that a plurality of equivalent embodiments of the invention are possible.

What is claimed is:

1. Filling pistol for the filling under pressure of an object essentially with nitrogen, wherein the filling pistol has a housing which comprises an inlet opening which is connectable to an air source to supply air to the filling pistol therewith, and also a separation device provided downstream of the inlet opening and connected to the inlet opening to obtain essentially nitrogen-rich gas therewith, and an outlet opening connected to the separation device, which is connectable to the object which is to be filled to supply nitrogen-rich air therewith from the filling pistol to the object, wherein the filling pistol comprises an exchangeable separation cartridge with an air inlet and a nitrogen outlet, wherein the separation device is provided between the air inlet and the nitrogen outlet of the separation cartridge, and the housing includes a first chamber and at least a distal end of the separation cartridge is removably received within the first chamber, and wherein the filling pistol comprises an operating element which is arranged to set the filling pistol to an operating condition in order to fill an object with nitrogen-rich gas.

2. Filling pistol according to claim 1, wherein the operating element comprises a trigger.

3. Filling pistol according to claim 2, wherein the separation cartridge is a detachable housing part, and can be detached from the remainder of the housing including the first chamber.

4. Filling pistol according to claim 3, wherein the filling pistol has a housing area for the detachable accommodation therein of the exchangeable separation cartridge.

5. Filling pistol according to claim 1, wherein the filling pistol has a presentation unit comprising a display or a screen.

6. Filling pistol according to claim 1, wherein the filling pistol comprises a feedback connection connected to the outlet opening.

7. Filling pistol according to claim 6, wherein a control valve is incorporated into the feedback connection, wherein gas can escape from the object in the open condition of the control valve.

8. Filling pistol according to claim 6, wherein a measuring sensor is connected to the feedback connection.

9. Filling pistol according to claim 8, wherein the filling pistol has a feed-in mechanism to feed in a required pressure, wherein the feed-in mechanism is connected to a processing means which is arranged to receive a measuring signal from the measuring sensor representing the pressure in the object and which is arranged to receive a signal from the feed-in mechanism, and wherein the processing means is further arranged to control a valve incorporated into the channel of the filling pistol in such a way that the object is brought to the required pressure.

10. Filling pistol according to claims 6, wherein a one-way valve is incorporated into the channel near the outlet opening of the filling pistol to allow nitrogen-enriched air through to the outlet opening.

11. Filling pistol according to claim 10, wherein the one-way valve comprises an orifice to deliver a preset product flow.

12. Filling pistol according to claim 1, wherein the separation cartridge comprises a number of hollow fibres which are suitable for separating nitrogen from air.

13. Filling pistol according to claim 1, wherein the separation cartridge is provided with recognizable identification, and wherein the filling pistol comprises an identification unit which is arranged to recognize the identification of the separation cartridge.

14. Filling pistol as in claim 1, wherein the separation cartridge comprises:
an elongated tubular cartridge housing including a first, inlet end, and a second, outlet end;
an air separation membrane enclosed within the housing, the membrane separating oxygen gas from an air stream passing through the cartridge from the inlet end to the outlet end and allowing nitrogen enriched air to pass along the membrane to the second end of the cartridge housing, and a peripheral chamber between the air separation membrane and an interior wall of the cartridge housing for collecting oxygen enriched air from the air separation membrane, an air outlet in the cartridge housing from the peripheral chamber allowing collected oxygen enriched air to be directed to atmosphere;
attachment means toward the first end of the cartridge housing enabling the cartridge housing to be connected to the filling pistol, the attachment means being located between the first, inlet end and the air outlet in the cartridge housing;
an end cap at the second, outlet end of the cartridge housing enclosing the downstream end of the air separation membrane and including an outlet port for directing nitrogen enriched air out from the cartridge housing to an object to be filled with nitrogen.

15. Filling pistol as in claim 14, wherein the attachment means includes the air outlet from the cartridge housing.

16. Filling pistol as in claim 14, wherein the attachment means is located between the first, inlet end and the air outlet of the cartridge housing.

17. Filling pistol as in claim 16, wherein the attachment means comprises an annular flange projecting outwardly from the housing.

18. Filling pistol as in claim 16, wherein the attachment means comprises a screw thread.

19. Filling pistol as in claim 14, wherein the attachment means comprises a flange projecting outwardly from the cartridge housing, and a threaded cap with a feed-through opening, which is received over the cartridge housing, engages the flange, and is received on cooperating threads on the housing of the pistol to retain the separation cartridge on the pistol housing.

20. Filling pistol according to claim 1, wherein the pistol housing comprises a handgrip portion and a central housing part, wherein the handgrip portion includes the inlet opening, and the first chamber is in the central housing part of the pistol housing, and the separation cartridge is closely received within the first chamber and removably fixed to the central housing part.

21. Filling pistol according to claim 20, wherein the cartridge housing includes a flange projecting outwardly from the cartridge housing, and the filling pistol further includes a threaded cap with a feed-through opening, received over the cartridge housing, engaging the flange, and received on cooperating threads on the housing of the pistol to retain the separation cartridge on the pistol housing.

22. Filling pistol according to claim 20, wherein the operating element comprises a trigger in the handgrip portion, operably controlling the flow of air through the pistol.

23. Filling pistol according to claim 20, wherein the cartridge housing includes an air outlet.

24. Filling pistol according to claim 23, wherein the pistol housing includes a second chamber, surrounding the distal end of the filter cartridge and defining an air flow path between the pistol housing and the cartridge housing, wherein the air outlet in the cartridge housing is located within the second chamber.

25. Filling pistol according to claim 24, further including a sealing device between the cartridge housing and the pistol housing defining the second chamber, to provide an airtight connection therebetween.

26. Filling pistol according to claim 25, wherein the sealing device comprises an O-ring seal located along an inner surface of the pistol housing defining the second chamber, and against an outer surface of the cartridge housing.

27. A filling pistol for the filling under pressure of an object essentially with nitrogen, wherein the filling pistol comprises:
  i) a pistol housing with
    a) a handgrip portion having an air inlet which is connectable to an air source to supply air to the filling pistol therewith, and an operating element which is arranged to set the filling pistol to an operating condition in order to fill an object with nitrogen-rich gas; and
    b) a central housing part having an air outlet, and a flow path through the pistol housing from the air inlet in the handgrip portion to the air outlet in the central housing part; and
  ii) an exchangeable separation cartridge with an air inlet and a nitrogen outlet for separating nitrogen from an air stream, the cartridge including a cartridge housing enclosing a separation device provided downstream of the air inlet in the cartridge, the separation device having an inlet fluidly connected to the air outlet in the central housing part and an outlet fluidly connected to the nitrogen outlet in the separation cartridge, the nitrogen outlet in the separation cartridge being connectable to the object to be filled, wherein the separation cartridge is removably fixed to the central housing part, and provides essentially nitrogen-rich gas from the nitrogen outlet to the object when connected to the nitrogen outlet.

28. The filling pistol according to claim 27, wherein the central housing part includes a first chamber, and the cartridge housing is closely received within the first chamber.

29. The filling pistol according to claim 28, wherein the cartridge housing includes a flange projecting outwardly from the cartridge housing, and the filling pistol further includes a threaded cap with a feed-through opening, received over the cartridge housing, engaging the flange, and received on cooperating threads on the central housing part of the pistol to retain the separation cartridge on the pistol housing.

30. The filling pistol according to claim 27, wherein the handgrip portion includes a trigger operably controlling the flow of air through the pistol.

31. The filling pistol according to claim 27, wherein the cartridge housing includes an air outlet.

32. The filling pistol according to claim 31, wherein the pistol housing includes a second chamber, surrounding the distal end of the filter cartridge and defining an air flow path between the pistol housing and the cartridge housing, and wherein the air outlet is located along the cartridge housing within the second chamber.

33. Filling pistol according to claim 27, further including a sealing device between the cartridge housing and the second chamber to provide an airtight connection therebetween.

34. Filling pistol according to claim 33, wherein the sealing device comprises an O-ring seal located along an inner surface of the second chamber, and sealing against an outer surface of the cartridge housing.

* * * * *